(12) United States Patent
Lee et al.

(10) Patent No.: US 6,965,659 B2
(45) Date of Patent: Nov. 15, 2005

(54) DEVICE AND METHOD FOR DETECTING A PERIOD OF AN INPUT SIGNAL

(75) Inventors: Jae-wook Lee, Osan (KR); Dae-yun Shim, Kwangmyoung (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 777 days.

(21) Appl. No.: 09/917,234

(22) Filed: Jul. 30, 2001

(65) Prior Publication Data

US 2002/0025013 A1 Feb. 28, 2002

(30) Foreign Application Priority Data

Aug. 26, 2000 (KR) ........................................ 2000-49936

(51) Int. Cl.[7] .............................................. H04L 7/00
(52) U.S. Cl. ...................................................... 375/354
(58) Field of Search ........................................ 375/354

(56) References Cited

U.S. PATENT DOCUMENTS

| | | | | |
|---|---|---|---|---|
| 4,517,519 A | * | 5/1985 | Mukaiyama | ................ 329/303 |
| 4,918,590 A | * | 4/1990 | Ohtuka et al. | ................ 363/37 |
| 5,477,003 A | * | 12/1995 | Muraki et al. | .......... 434/307 A |
| 6,111,833 A | * | 8/2000 | Nakagawa et al. | ....... 369/59.23 |

* cited by examiner

*Primary Examiner*—Mohammed Ghayour
*Assistant Examiner*—Anika Talapatra
(74) *Attorney, Agent, or Firm*—Sughrue Mion, PLLC

(57) ABSTRACT

A device and method for detecting a period of an input signal including a count value setting portion; an A/D converter; a zero cross point detecting portion to detect a symbol change of digital values received from the A/D converter; a arithmetic processing unit; a counter; and a period value calculating portion. The arithmetic processing unit divides two sampling sectors, having a zero cross point in their center, by a preset value which is set in the count value setting portion, predicts a zero cross point sector based on the digital values of two sampling points, and calculates a count value of the reference clock in accordance with the predicted zero cross point sector and the preset value which is set in the count value setting portion.

12 Claims, 5 Drawing Sheets

DEVICE AND METHOD FOR DETECTING A PERIOD OF AN INPUT SIGNAL

BACKGROUND OF THE INVENTION

1. Field of the Invention

The present invention relates to a device and a method for detecting a period of an input signal, and more particularly, to a device and a method for detecting a period of an input signal exclusively through a reference clock with (n) times greater accuracy. The present application is based on Korean Patent Application No. 2000-49936, filed Aug. 26, 2000, which is incorporated herein by reference.

2. Related Art

Sampling theory postulates that a signal that varies continuously with time is completely determined by its values at an infinite sequence of equally spaced times if the frequency of these sampling times is greater than twice the highest frequency component of the signal. According to the sampling theory, a period detector used in a CD (Compact Disk) or a DVD (Digital Video Disk) detects a period of an input signal by counting series of sectors to which the signal is input, by two times a reference clock. To perform the above mentioned detecting, rather simple devices such as a counter using two times clock and a comparator identifying symbols of the input signal have been used.

Referring to FIG. 1 illustrating a conventional method for detecting a period of an input signal a, each period of clock b, i.e., two times a reference clock c is counted d and accumulated e at a point which (+) and (−) symbols of the input signal a are changed. The accumulated value "9" prior to a zero cross point is output as a count value e, then the previous count value is initialized to count a new number of clock periods until a next zero cross point. Then, a new count value after a change of the input signal symbols is accumulated until the next change of the symbol, and output as a count value "5". And the previous count value is initialized repeatedly to count a new number of clock periods. Here, the output count values e of "9" and "5" are divided by n times, where n=2, thereby a frequency f with resulting values of "4.5" and "2.5" accordingly is detected.

The conventional method for detecting a period of an input signal, as described above, is widely used due to a high restoring rate of original information, and its simple hardware structure. Detecting a period of an input signal with a higher resolution can be done by using n times clock of a reference clock.

A hardware structure for using n times clock is simple when a data transmitting speed of CD/DVD is low. However, a competition over the data transmitting speed is keen at the present time, thus, the hardware structure for using n times clock becomes complex. It is difficult for the present technology to cope with the complex hardware structure for using n times clock of the reference clock to obtain a higher resolution.

SUMMARY OF THE INVENTION

Therefore, it is an object of the present invention to provide a device and a method for detecting a period of an input signal with desired accuracy of n times a reference clock in order to resolve the above mentioned problem.

To achieve the above mentioned object, a device for detecting a period of an input signal includes a count value setting portion for setting a reference clock to be counted by n times a reference clock, an A/D converter for sampling an analog input signal at each period of the reference clock, and converting the signal into digital values having (+) and (−) symbols, a zero cross point detecting portion for detecting a change of the digital values output from the A/D converter, and outputting a zero cross point detecting signal, an arithmetic processing unit for dividing a sampling sector having a zero cross point therein, by a preset value which is set in the count value setting portion, predicting a zero cross point sector based on the digital values of both sampling points, and calculating a count value of each reference clock in accordance with the preset value and the predicted zero cross point sector, a counter for accumulating the count values of each reference clock, which are calculated in the arithmetic processing unit, until the symbol of the digital value is changed, and a period value calculating portion for dividing the accumulated count values in the counter by the preset value which is set in the count value setting portion, and calculating a period of the input signal thereof.

The arithmetic processing unit includes a zero cross point sector detecting portion for dividing a sampling interval between two sampling points having a zero cross point therein, by a preset value which is set in the count value setting portion, and outputting an increase/decrease signal of the count value in accordance with the zero cross point sector which is predicted based on the ratio of the digital values by (+) and (−) symbol change of the input signal, and a count value determining portion for determining the count value of each reference clock in accordance with the preset value which is set in the count value setting portion, and the zero cross point sector which is predicted in the zero cross point sector detecting portion.

A method for detecting a period of an input signal includes a step of sampling an analog input signal at each reference clock and A/D converting the signal into digital values having (+) and (−) symbols, a step of detecting a zero cross point based on a change of the symbols which is detected from the A/D converting step, a step of arithmetic processing by dividing a sampling sector having a zero cross point therein, by a preset value which is set in the count value setting portion, predicting a zero cross point sector based on the digital values at sampling points, and calculating the count value of each reference clock in accordance with the preset value and the predicted zero cross point sector, a step of accumulating the count values of each reference clock calculated from the arithmetic processing step, until a next symbol change of the input signal, a step of dividing the accumulated values in the counter by the preset value, and calculating a period of the input signal.

The arithmetic processing step further includes a step of dividing a sampling sector having a zero cross point therein which is detected from the zero cross point detecting step, by the preset value which is set in the count value setting portion, and predicting a zero cross point sector based on the ratio of the digital values by (+) and (−) symbol change of the input signal, and a step of determining count value of each reference clock in accordance with the preset value and the zero cross point sector predicted from the zero cross point sector detecting portion.

DETAILED DESCRIPTION OF THE PREFERRED EMBODIMENTS

Hereinafter, the preferred embodiments of the present invention will be described in greater detail with reference to the attached drawings.

Figure 1:
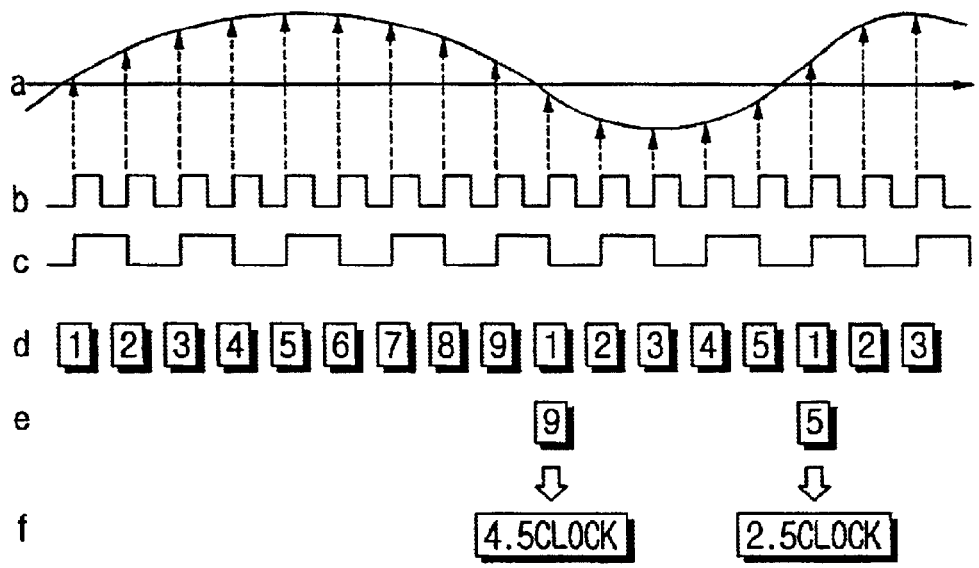
FIG. 1 is a diagram showing a conventional method for detecting a period of an input signal.
Figure 2:
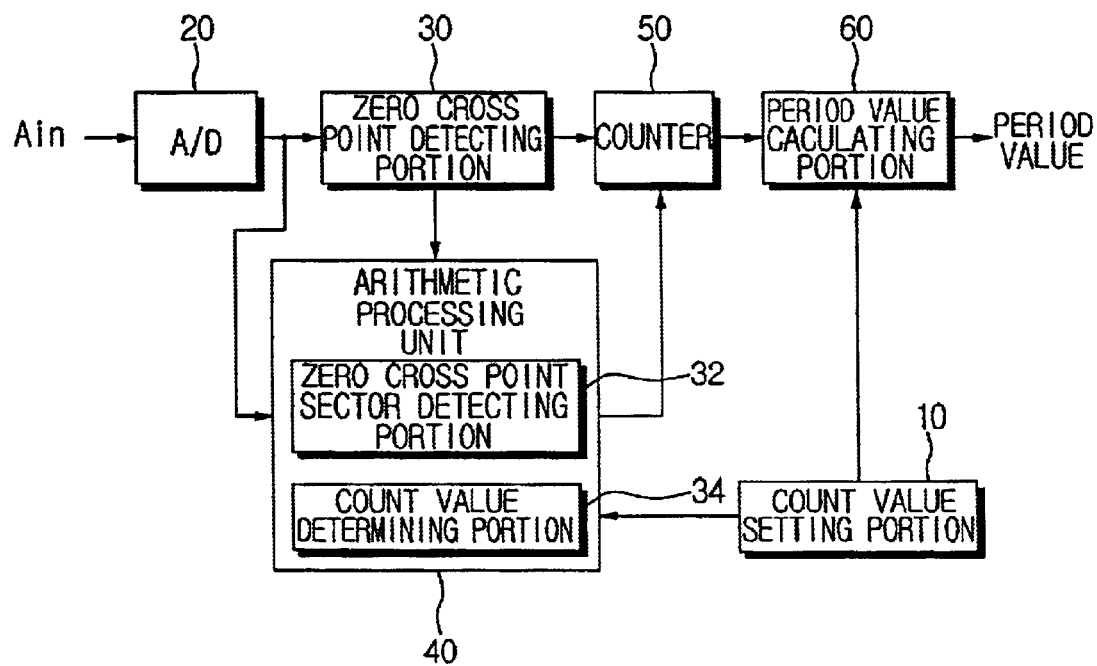
FIG. 2 is a block diagram showing a method for detecting a period of an input signal according to the present invention.

As shown in FIG. 2, a device for detecting a period of an input signal according to the first preferred embodiment of the present invention includes a count value setting portion 10, an analog-to-digital (A/D) converter 20, a zero cross point detecting portion 30, an arithmetic processing unit 40, a counter 50, and a period value calculating portion 60.

The count value setting portion 10 sets a period of a reference clock to be counted by n times. The A/D converter 20 samples an analog input signal Gain at each period of the reference clock and converts the input signal Ain into digital values having positive (+) and negative (−) symbols. The zero cross point detecting portion 30 identifies a zero cross point based on a symbol change of the digital values output from the A/D converter 20, and outputs the zero cross point detecting signal. The arithmetic processing unit 40 divides a sampling sector having the zero cross point therein, by a preset value which is set in the count value setting portion 10. The arithmetic processing unit 40 then predicts a zero cross point sector based on the digital values of two sampling points of the sampling sector, and calculates a count value of each reference clock in accordance with the predicted zero cross point sector. The counter 50 accumulates the count values of the reference clock, until a next symbol of the input signal is changed. The period value calculating portion 60 divides the accumulated values by the preset value which is set in the count value setting portion 10, and calculates a period of the input signal Ain.

The arithmetic processing unit 40 includes a zero cross point sector detecting portion 32 and a count value determining portion 34.

When the zero cross point is detected in the zero cross point detecting portion 30, the zero cross point sector detecting portion 32 divides the sampling sector having the zero cross point therein, by the preset value which is set in the count value setting portion 10, predicts the zero cross point sector based on a slope of an imaginary line containing two sampling values from the sampling points at the sampling interval, and outputs increase/decrease signals of the count value. The count value determining portion 34 calculates the count value of the reference clock based on the preset value which is set in the count value setting portion 10, increases/decreases the count value in accordance with the increase/decrease signals output from the zero cross point sector detecting portion 32, and determines the count value of the reference clock based on the increased/decreased count value.

When the sampling interval is divided by the preset value in the zero cross point sector detecting portion 32, it is preferable to divide by n+1 if the preset value is n. It is possible that the sampling interval is divided by n if the preset value is n. The difference is whether the increase/decrease signal is output as a value either from "0" to "n or −n", or from "1" to "n or −n". Hereinafter, it will be described when the sampling interval is divided by n+1 if the preset value is n.

Figure 3A:
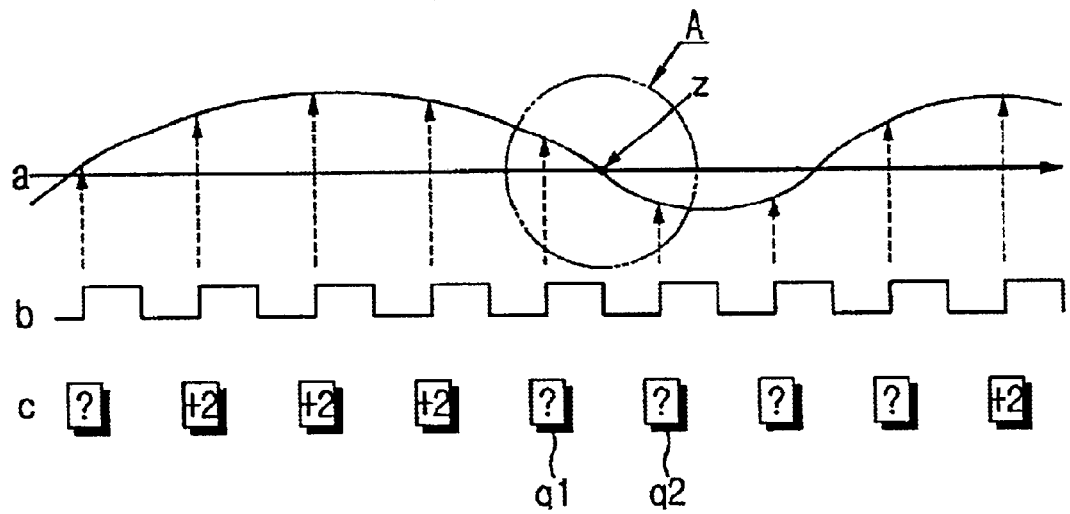
FIGS. 3A and 3B are diagrams showing detecting a period of an input signal with two times accuracy according to the present invention.
Figure 3B:
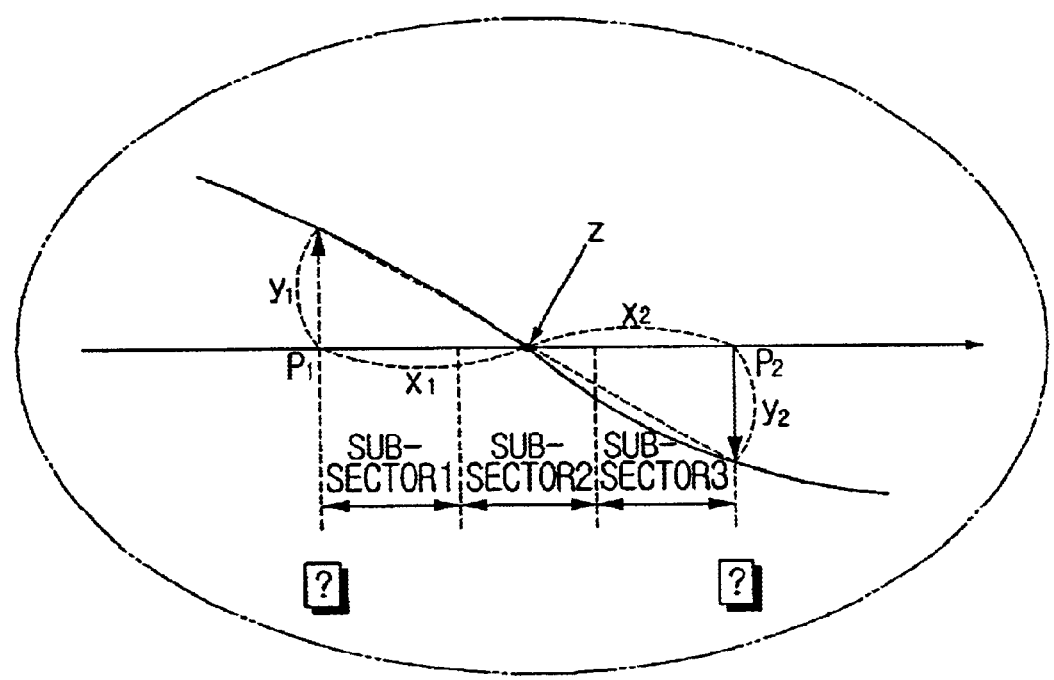

The method for detecting a period as described above according to the first preferred embodiment of the present invention is as follows. Referring to FIGS. 3A and 3B, the count value setting portion 10 sets a period of the reference clock to be counted by two times. The A/D converter 20 converts the analog input signal a, into the digital values having (+) and (−) symbols at each period of the reference clock b. The zero cross point detecting portion 30 identifies the zero cross point in accordance with the symbol change of the output digital values, and outputs the zero cross point detecting signal.

The zero cross point sector detecting portion 32 equally divides the sampling interval A having the zero cross point z therein into three sectors, as shown in FIG. 3B, and predicts the zero cross point z among three divided sectors based on the digital values y1 and y2 from both the sampling points at the sampling interval A. The digital values y1 and y2 of the sampling sectors are already calculated by the A/D converter. By linking each end of the digital values y1 and y2 as shown in FIG. 3B with a dotted line, the zero cross point z can be predicted as it meets with the reference voltage which determines (+) and (−) symbols. Symmetrical right triangles can be seen as the dotted line in FIG. 3B, with the zero cross point z being located in the center. The relation between the digital values y1 and y2, and the distances of each sampling point x1 and x2 toward the zero cross point z, can be represented as the formula x1:x2= y1:y2.

If the zero cross point z is located in a sector 2 as shown in FIG. 3B, the zero cross point sector detecting portion 32 outputs +3, which is increased by one, as a count value q1 of the sampling point that is before the zero cross point occurrence. If the zero cross point z is located in a sector 1, the zero cross point sector detecting portion 32 outputs +2, which is increased by zero. If the zero cross point z is located in a sector 3, the zero cross point sector detecting portion 32 outputs +4, which is increased by two. As a count value q2 of the sampling point, that is after the zero cross point occurrence, the zero cross point sector detecting portion 32 outputs +2, which is decreased by zero, if the zero cross point z is located in the sector 1, +1 which is decreased by one if the zero cross point z is located in the sector 2, and 0, which is decreased by two, if the zero cross point z is located in the sector 3.

The sum of a couple of count values having the zero cross point z in their center is constantly +4, and increased/decreased count value is determined in accordance with the zero cross point location.

Figure 4:
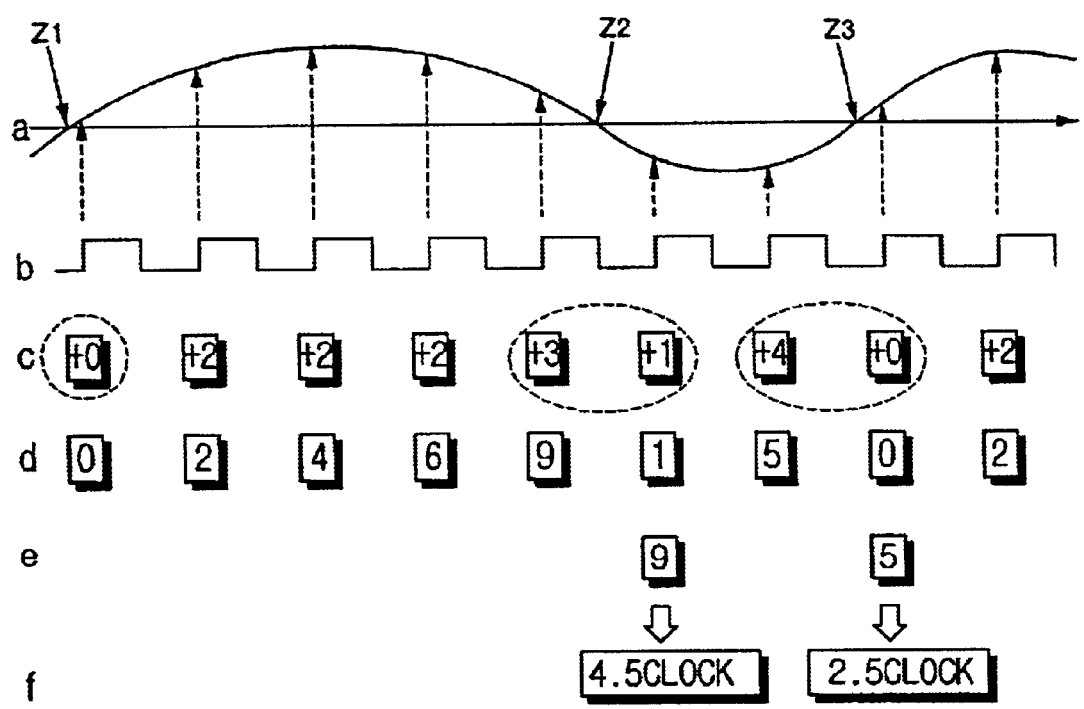
FIG. 4 is a diagram showing a result of the detecting a period of an input signal with two times accuracy according to the present invention.

FIG. 4 shows a result of the detecting a period of input signal by two times the reference clock. Each zero cross point z1, z2, z3 is represented on the input signal a. If the analog signal a is continuously input without a zero cross point occurrence, a count value c of each period is determined as +2. The count value of each period is determined respectively in accordance with the location of the zero cross point z1, z2, z3.

The counter 50 accumulates the count values of the reference clock by the count value determining portion 34, outputs the accumulated values e "9" and "5" upon occurrence of the zero cross point, and initializes the calculation to count a new value.

The period value calculating portion 60 divides the accumulated values e output from the counter 50, by two times which is set in the count value setting portion 10, and outputs the resulting value as a frequency f of the input signal a. The frequencies of each period of clock "4.5" and "2.5" are calculated if the accumulated values are "9" and "5".

Figure 5A:
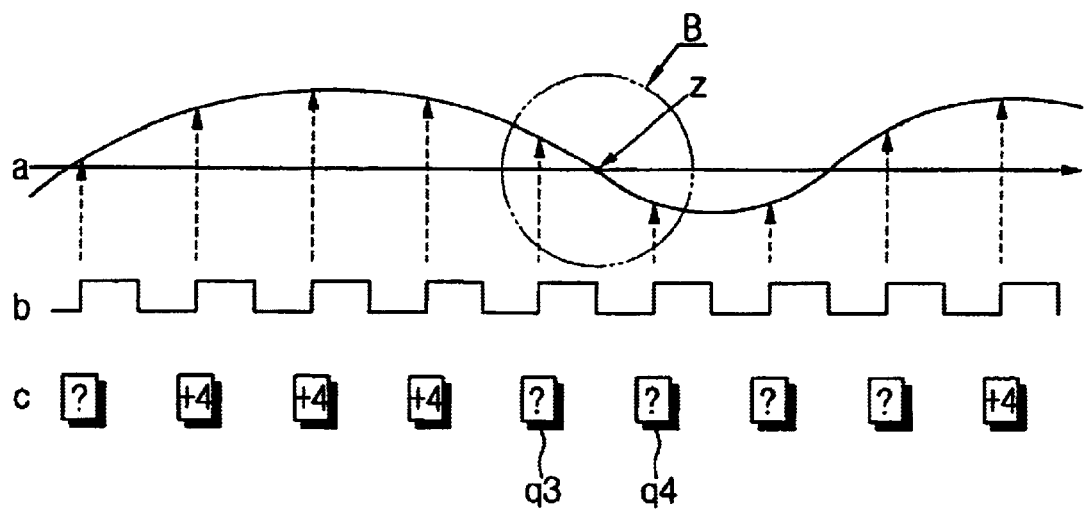
FIGS. 5A and 5B are diagrams showing the detecting a period of an input signal with four times accuracy according to the present invention.
Figure 5B:
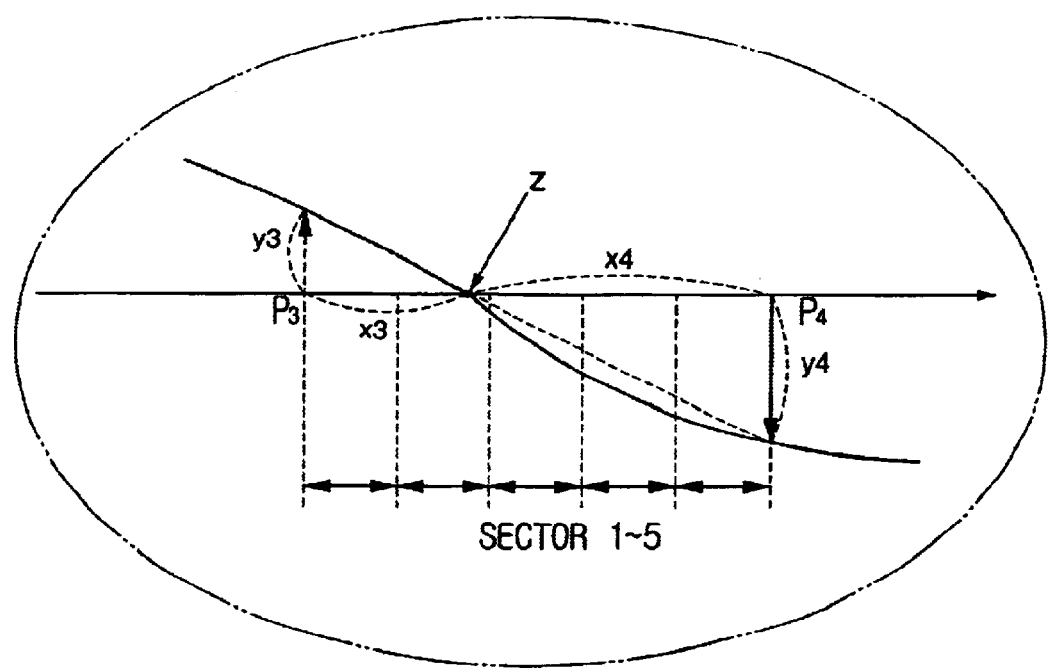

A second preferred embodiment of the present invention will be described hereinafter. FIGS. 5A and 5B show the detecting a period of an input signal by 4 times the reference clock. A sampling interval B having the zero cross point z therein is equally divided into 5 sub-sectors When an analog signal a is constantly input, the count value c of the reference clock b is determined as +4 contrast to +2 in the first preferred embodiment of the present invention. The zero cross point z is predicted based on the ratio of the digital values y3 and y4 of the sampling p3 and p4, and the distances of the sampling points p3 and p4 toward the zero cross point x3 and x4.

The sum of the count value which is detected from the sampling interval having the zero cross point z therein, equals +8. The count value of the sampling point, that is before the zero point occurrence, is determined as one value chosen from +4 to +8 in accordance with the zero cross point location, the count value of the sampling point, that is after the zero point occurrence, is determined as one value chosen from +4 to 0. As shown in FIG. 5B, the zero cross point z is located in a sector 2, thereby the count value q3 of the first sampling point from FIG. 5A is +5 which is increased by one. And the count value q4 of the second sampling sector from FIG. 5A is +3.

Figure 6:
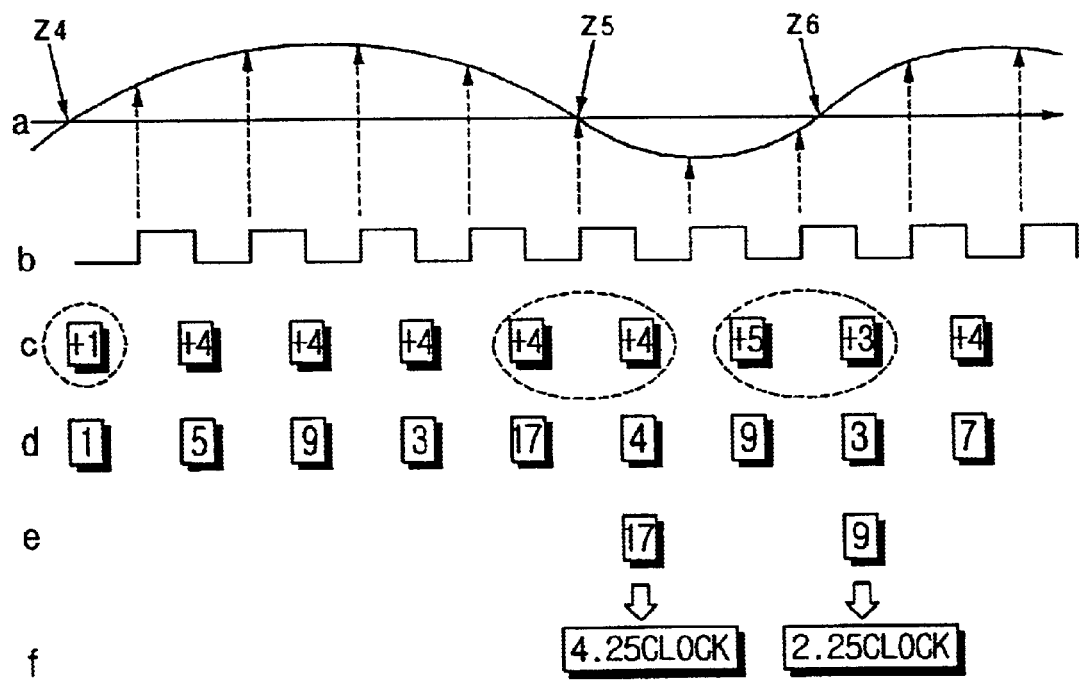
FIG. 6 is a diagram showing a result of the detecting a period of an input signal with four times accuracy according to the present invention.

FIG. 6 shows a result of detecting a period of an input signal by four times the reference clock. Each zero cross point z4, z5, z6 of the analog input signal a is represented on the FIG. 6. The count values c of the reference clock b are represented on FIG. 6. The count values of the first and second sampling points located on each zero cross point z4, z5, z6 are represented in dotted circles in FIG. 6.

The counter 50 accumulates the count values d by four times the reference clock b if the analog signal a is constantly input without the occurrence of the zero cross point, outputs the accumulated values "17" and "9", and initializes the counting to count a new number of clock.

The period value detecting portion 60 divides the accumulated values "17" and "9" by four, and detects the resulting values "4.25" and "2.25" as the frequencies of the clock.

According to the present invention, detecting a period of an input signal with desired n times magnification can be done by using and modifying the preferred embodiments as described above.

The device and the method of detecting a period of an input signal according to the present invention do not require a high frequency clock nor complex hardware structure since the device only requires the reference clock for detecting a period of an input signal with desired high resolution.

It is to be understood, however, that even though the present invention has been described with reference to the attached drawings which depict the preferred embodiments thereof, the present invention is not limited to the said embodiments, and may apparently be modified in many ways by those who skilled in the art without departing from the general principle and scope of the invention expressed in the appended claims.

What is claimed is:

1. A device for detecting a period of an input signal comprising:
    a count value setting portion for setting a reference clock to be counted by n times, where n is an integer;
    an analog-to-digital (A/D) converter for sampling an analog input signal at each period of the reference clock, and converting the input signal into digital values having positive and negative symbols;
    a zero cross point detecting portion for detecting a symbol change of the digital values output from the A/D converter, and generating a zero cross point detecting signal;
    an arithmetic processing unit for dividing a sampling interval between two sampling points having a zero cross point therein, by a preset value which is set in the count value setting portion, predicting a zero cross point sector based on the digital values of the two sampling points, and calculating count values of the reference clock in accordance with the preset value and the predicted zero cross point sector;
    a counter for accumulating the count values of the reference clock which are calculated in the arithmetic processing unit, until the symbols of the digital values are changed; and
    a period value calculating portion for dividing the accumulated count values in the counter by the preset value which is set in the count value setting portion, and calculating periods of the input signal.

2. The device as claimed in claim 1, wherein the arithmetic processing unit further comprises: a zero cross point sector detecting portion for dividing the sampling interval having the zero cross point therein, by the preset value which is set in the count value setting portion, and generating an increase signal or a decrease signal of the count value in accordance with the zero cross point location which is predicted based on a ratio of the digital values by positive and negative symbol change of the input signal; and
    a count value determining portion for determining the count value of the reference clock based on the preset value which is set in the count value setting portion, and the zero cross point location which is predicted in the zero cross point sector detecting portion.

3. The device as claimed in claim 2, wherein the zero cross point detecting portion divides the sampling interval having the zero cross point therein, by n+1 if the preset value is n.

4. The device as claimed in claim 2, wherein the zero cross point sector detecting portion generates, in accordance with the zero cross point location, the increase signal as a value chosen from zero to n in a first sampling point of the sampling interval, and the decrease signal as a value chosen from n to zero in a second sampling point of the sampling interval.

5. The device as claimed in claim 2, wherein the zero cross point detecting portion divides the sampling interval having the zero cross point therein, by n if the preset value is n.

6. The device as claimed in claim 5, wherein the zero cross point sector detecting portion generates, in accordance with the zero cross point location, the increase signal as a value chosen from one to n in a first sampling point of the sampling interval, and the decrease signal as a value chosen from n to one in a second sampling point of the sampling interval.

7. A method for detecting a period of an input signal comprising the steps of:
    sampling an analog input signal at each period of a reference clock and converting the input signal into digital values having positive and negative symbols;
    detecting a zero cross point based on a detected change of the symbols of the digital values;

arithmetic processing by dividing a sampling interval between two sampling points having a zero cross point therein by a preset value, predicting a zero cross point sector based on the digital values of the two sampling points, and calculating count values of the reference clock in accordance with the preset value and the predicted zero cross point location;

accumulating the count values of the reference clock calculated from the arithmetic processing step until a next symbol change of the input signal;

dividing the accumulated values by the preset value, and calculating a frequency of the input signal.

8. The method as claimed in claim 7, wherein the arithmetic processing step further comprises the steps of:

dividing the sampling interval having the zero cross point therein, which are detected from the zero cross point detecting step, by the preset value, and predicting a zero cross point sector based on a ratio of the digital values by positive and negative symbol change of the input signal;

determining count values of the reference clock in accordance with the preset value and the zero cross point location predicted from the zero cross point sector detecting portion.

9. The method as claimed in claim 8, wherein the zero cross point detecting step includes the step of dividing the sampling interval having the zero cross point therein, by n+1 if the preset value is n.

10. The method as claimed in claim 9, wherein the zero cross point sector detecting step includes the step of generating an increase signal as a value chosen from zero to n in a first sampling point of the sampling interval in accordance with the zero cross point location, and a decrease signal as a value chosen from n to zero in a second sampling point of the sampling interval in accordance with the zero cross point location.

11. The method as claimed in claim 8, wherein the zero cross point detecting step includes the step of dividing the sampling interval having the zero cross point therein, by n if the preset value is n.

12. The method as claimed in claim 11, wherein the zero cross point sector detecting step includes the step of generating an increase signal as a value chosen from one to n in the first sampling point of the sampling interval, and a decrease signal as a value chosen from n to one in a second sampling point of the sampling interval.

* * * * *